United States Patent Office

3,591,459
Patented July 6, 1971

3,591,459
METHOD OF ENZYME DETERMINATION
Reinhard Haschen and Wolfgang Farr, Halle (Saale), Dieter Reichelt, Bitterfeld, and Norbert Rehfeld, Halle (Saale), Germany, assignors to VEB Arzneimittelwerk Dresden, Radebeul, Germany
No Drawing. Filed Jan. 4, 1968, Ser. No. 695,585
Int. Cl. G01n 31/14
U.S. Cl. 195—103.5                                3 Claims

---

ABSTRACT OF THE DISCLOSURE

A method of testing a substance, for example, blood serum, to quantitatively determine the presence of amino acid arylamidase catalytic activity, in which the substance is mixed with a substituted alanine derivative whereby any amino acid arylamidase catalytic activity present splits the substituted alanine derivative to form a substituent which can directly be colorimetrically determined or which can be converted to another substance which, in turn, can be colorimetrically determined.

---

This invention relates to a method of enzyme determination, which is specially suitable for the quantitative colorimetric determination of amino acid arylamidase catalytic activity in blood serum.

Methods for the quantitative determination catalytic activity of amino acid arylamidase, sometimes erroneously designated as leucinaminopeptidase, are known. In these methods preferably leucin-p-nitroanilide or leucin-$\beta$-naphthylamide is used as the substrate. P-nitroanilide freed from leucin-p-nitroanilide by the action thereon of amino acid arylamidase catalytic activity is directly photometrically determined on the basis of its yellow color. The detection of $\beta$-naphthylamine set free from leucin-$\beta$-naphthylamide by the action of amino acid arylamidase catalytic activity thereon can be carried out by conversion of the $\beta$-naphthylamine with the diazonium salt Fast Red 3GL, by conversion of the $\beta$-naphthylamine with naphthylethylene diamine after diazotization or by conversion of the $\beta$-naphthylamine with p-dimethylaminobenzaldehyde. The conversion of hydrazine as the product of hydrolysis of leucin hydrazide with p-dimethylaminobenzaldehyde is the subject of commonly assigned copending application Ser. No. 695,365, filed Jan. 3, 1968.

Furthermore, it is known that the amino acid arylamidase catalytic activity can be determined with the use of L-alanine-4-(phenylazo)-phenylamide as the substrate. The phenylazophenylamine set free by the enzyme has a red color and, after centrifugation, is colorimetrically determined.

These known methods have many disadvantages. Substrates with N-terminal leucine are not optimal for amino acid arylamidase catalytic activity with respect to specificity and sensitivity. When alanine-4-(phenylazo)-phenylamide is used, the additional step of centrifugation is necessary prior to measurement.

It is an object of the invention to provide a method of determining amino acid arylamidase catalytic activity, and, especially, a sensitive method which is suitable for clinical diagnosis of liver, pancreas, kidney and intestinal disorders.

According to the invention, there are provided methods for the determination of amino acid arylamidase catalytic activity which are specific and highly sensitive for that enzyme and which can quickly and simply be carried out with high accuracy.

According to the invention, it is found that substituted alanine derivatives, such as alanine hydrazide, alanine-$\beta$-naphthylamide and alanine-p-nitroanilide, as the substrate split better and more specifically than leucine compounds with respect to amino acid arylamidase catalytic activity.

The methods of the invention are characterized in that the substance in which amino acid arylamidase catalytic activity may be present is
  (a) mixed with DL-alanine hydrazide and hydrazine hydrolytically split therefrom by the action thereon of any amino acid arylamidase present in the substance is reacted with an aromatic aldehyde, preferably p-dimethylaminobenzaldehyde, to yield a yellow colored substance which upon adjustment of the mixture to an acid pH becomes orange-red or
  (b) mixed with DL-alanine-$\beta$-naphthylamide and $\beta$-naphthylamine hydrolytically split therefrom by the action thereon of any amino acid arylamidase catalytic activity present in the substance is converted by reaction with an aromatic aldehyde, preferably p-dimethylaminobenzaldehyde, to a yellow colored substance which upon adjustment of the mixture to an acid pH becomes orange-red or
  (c) mixed with L-alanine-p-nitroanilide and p-nitroaniline hydrolytically split therefrom by the action thereon of any amino acid arylamidase catalytic activity present in the substance is directly colorimetrically determined.

With respect to methods (a) and (b), aromatic aldehyde other than p-dimethylaminobenzaldehyde which may be used are, for example, 4-diethylaminobenzaldehyde
3-nitro-4-dimethylaminobenzaldehyde The hydrolysis of alanine compounds by amino acid arylamidase takes place in what we refer to as an "incubation," in which the pH of the mixture of the substrate (i.e., the alanine compound) and the substance being tested is maintained in the range of from 6.5 to 7.5. While the temperature of the mixture during the incubation and the period of the incubation are not critical, it is generally preferred that the former be in the range of from 20 to 37° C. and the latter be in the range of from 5 to 120 minutes. In methods (a) and (b), simultaneously with the condensation of the hydrazine or $\beta$-naphthylamine with the aromatic aldehyde, the mixture is adjusted to an acid pH, i.e., a pH below 7, whereby the initially yellow compound changes to an orange-red color. This acidification at the same time causes the enzymatic reaction to terminate. The quantity of any amino acid arylamidase catalytic activity present is proportional to the extinction of the orange-red colored salt formed, the latter being measured by its characteristic light absorption maximum of 450–455 m$\mu$. By the methods of the invention, one is able to determine amino acid arylamidase catalytic activity in, for example, blood serum, quickly and quantitatively. Furthermore, the indicator reaction of the invention has the advantage as compared with the known methods that it is extremely specific and highly sensitive for amino acid arylamidase catalytic activity.

As compared with the known method employing alanine-4-(phenylazo)-phenylamide as the substrate, the methods of the invention have the following advantages:
  (1) alanine hydrazide is significantly easier to synthesize and, accordingly, more economical; the molar extinction coefficient is about 4 to 5 times higher;
  (2) the specificity of alanine-$\beta$-naphthylamide is higher, it is about twice as effectively split by the amino acid arylamidase catalytic activity; the molar extinction coefficient is 5 times higher; this substrate likewise may be used for the specific histochemical indication of amino acid arylamidase;
  (3) the molar extinction coefficient in the case of determination with alanine-p-nitroanilide is indeed on the same order of magnitude as in the case of alanine-4-(phenylazo)-phenylamide but the method may be carried as a kinetic test.

Moreover, in none of the methods of the invention there occurs the precipitation of a protein, and, accordingly, no centrifugation is necessary before measurement.

The invention will now be further described by reference to the following examples, in which all proportions are by weight:

Example 1 (alanine hydrazide as the substrate)

0.6 ml. of a buffered substrate solution constituted of 5 parts of 0.6 M aqueous triethanolamine buffer solution of pH 7.15 and one part of 224 millimolar aqueous DL-alanine hydrazide solution and 0.1 ml. of blood serum are combined and held at 25° C. for a period of 15 minutes (incubation). Then is added 5 ml. of a coloring reagent constituted of 1 part of a solution of 4 g. of p-dimethylaminobenzaldehyde in 100 ml. 96% aqueous ethanol or methanol and 17 parts of 0.1 N hydrochloric acid and after 30 minutes, during which an orange-red color is formed, the color with respect to an absorption maximum of 455 m$\mu$ as compared with the coloring reagent is measured. As a control, a second assay of the same composition is set up, but the enzyme solution is added after the addition of the coloring reagent.

Example 2 (alanine-$\beta$-naphthylamide as the substrate)

0.5 ml. of 3.0 millimolar aqueous DL-alanine-$\beta$-naphthylamide solution and 0.5 ml. of 0.1 M aqueous Soerensen phosphate buffer solution of pH 7.0 are combined with 0.02 ml. of blood serum and the mixture is maintained at 25° C. for 30 minutes (incubation). Then are added 4 ml. of a coloring reagent constituted of 2 ml. of 0.4 N hydrochloric acid and 2 ml. of a 4% solution of p-dimethylaminobenzaldehyde in methanol. Development of an orange-red color is allowed to proceed for 10 minutes. The color formed is measured with respect to a light absorption maximum of 450 m$\mu$ and compared with an analogously treated assay in which the enzyme solution was first added after the addition of a coloring reagent.

Example 3 (alanine-p-nitroanilide as the substrate)

1 ml. of 2 millimolar aqueous alanine-p-nitroanilide solution and 1 ml. of 0.1 M aqueous Soerensen phosphate buffer solution of pH 7.0 are mixed with 0.1 ml. of blood serum and the mixture is adjusted to 25° C. The color of the mixture with respect to a light adsorption maximum of 405 m$\mu$ is measured against water. Then, the mixture is allowed to stand for 15 minutes at 25° C. (incubation). Finally, the mixture is again measured against water with respect to a light absorption maximum of 405 m$\mu$ to determine the amount of p-nitroaniline formed.

The method employing alanine hydrazide is analogous to the method of the above referred to copending application, employing the same reagents in the same concentrations and, therefore, is useful for the parallel determination of amino acid arylamidase catalytic activity. The error involved in this method is plus or minus 2.7%.

In the method employing alanine-p-nitroanilide, the error is plus or minus 4.8%.

Alanine-$\beta$-naphthylamide as the substrate is split with the greatest speed by amino acid arylamidase catalytic activity. This method has an error of plus or minus 2.0% and is better than the other methods for microliter scale testing.

While the invention has been described by reference to preferred embodiments thereof, the scope of the invention as defined by the appended claims is intended to include not only these embodiments but also all modifications and variations thereof which would be obvious to one skilled in the art.

What is claimed is:

1. Method of testing a substance to quantitatively determine the presence of amino acid arylamidase catalytic activity, comprising mixing the substance with an alanine derivative of the group consisting of DL-alanine hydrazide and L-alanine-p-nitroanilide, maintaining the pH of the mixture in the range of from 6.5 to 7.5 for a period of from 5 to 120 minutes whereby the alanine derivative is hydrolytically split to form hydrazine when the alanine derivative is the hydrazide or p-nitroaniline when the alanine derivative is the p-nitroanilide, and then, when the alanine derivative is the p-nitroanalide, colorimetrically determining the quantity of p-nitroaniline with respect to a light absorption maximum of 405 m$\mu$ or when the alanine derivative is the hydrazide then adding to the mixture p-dimethylaminobenzaldehyde, 4-diethylaminobenzaldehyde or 3-nitro-4-dimethylaminobenzaldehyde and simultaneously lowering the pH of the mixture to a value below 7 whereby an orange-red colored substance is formed and colorimetrically determining the quantity of the colored substance with respect to a light absorption maximum of 455 m$\mu$ when the alanine derivative is the hydrazide.

2. Method according to claim 1, in which the alanine derivative is the hydrazide.

3. Method according to claim 1, in which the alanine derivative is the p-nitroanilide.

References Cited

Monis: "J. Histochem," 12: 869–74, 1964.
Goldbarg et al.: "Cancer," 11: 283–91, 1958.
Watt et al.: "Anal. Chem.," 26(3): 452–53, 1954.
Mellor: "Comprehensive Treatise of Organic & Theoretical Chem.," vol. 8, 1928.
Kolsek et al.: "Z. Anal. Chem.," 159: 113–17, 1957.

ALVIN E. TANENHOLTZ, Primary Examiner

M. D. HENSLEY, Assistant Examiner